(12) United States Patent
Lam (10) Patent No.: US 7,845,239 B1
(45) Date of Patent: Dec. 7, 2010

(54) DISPOSABLE FLOW CHAMBER ELECTRO-MAGNETIC FLOW SENSOR

(75) Inventor: Wing Yin Lam, Yorba Linda, CA (US)

(73) Assignee: Polysensors Inc., Diamond Bar, CA (US)

( * ) Notice: Subject to any disclaimer, the term of this patent is extended or adjusted under 35 U.S.C. 154(b) by 280 days.

(21) Appl. No.: 12/198,212

(22) Filed: Aug. 26, 2008

Related U.S. Application Data (63) Continuation-in-part of application No. 11/388,486, filed on Mar. 24, 2006, now Pat. No. 7,415,892.

(51) Int. Cl.
*G01F 1/58* (2006.01)

(52) U.S. Cl. .................................................. 73/861.15

(58) Field of Classification Search ............... 73/861.15, 73/861.12, 723; 324/204; 702/38, 45
See application file for complete search history.

(56) References Cited

U.S. PATENT DOCUMENTS

| | | | | |
|---|---|---|---|---|
| 4,503,711 A | * | 3/1985 | Bohn | ........................ 73/861.12 |
| 5,852,362 A | * | 12/1998 | Batenburg et al. | .......... 324/204 |
| 6,845,330 B2 | * | 1/2005 | Okuda et al. | .................. 702/38 |
| 6,853,928 B1 | * | 2/2005 | Mitsutake | .................... 702/45 |
| 2007/0261496 A1 | * | 11/2007 | Jonsson et al. | ................ 73/723 |

* cited by examiner

*Primary Examiner*—Jewel Thompson (57) ABSTRACT

The present invention is an assembly of a removable and preferably disposable electromagnetic flow chamber cassette adapted to be connected with a receiver having a coil and C-shaped core. An orientation slot in the C-shaped core and a supported insertion slot for electrical connection of the cassette cause an electrode bearing flow chamber to exposed to a magnetic field. Voltages across two or more pairs of electrodes are detected by microprocessor means for calculation and display of a flow rate of a flowing liquid in the flow chamber.

10 Claims, 13 Drawing Sheets

FLOW CHANNEL WHERE LIQUID CONTACT WITH ELECTRODE

INTERNAL VIEW OF A DISPOSABLE FLOW CHAMBER

DISPOSABLE FLOW CHAMBER ELECTRO-MAGNETIC FLOW SENSOR

This is a continuation in part application of U.S. Ser. No. 11/388,486 filed Mar. 24, 2006.

BACKGROUND OF THE PRESENT INVENTION

1. Field of Invention

The present invention relates to the art of Fluid Flow Measurement and control for the contamination free environment. This invention is emphasis on Disposable Flow Chamber and Electro-Magnetic Flow Sensor. The Disposable Flow chamber allows isolation of contaminations between sessions. The invention device apply Electro-Magnetic field to the Disposable Flow Chamber then converts the responded signal and to flow speed. It finds particular application in conjunction with volumetric flow sensor, and will be described with particular reference thereto. However, it is to be appreciated that the present invention is also amenable to other like application. Though this invention is particularly suitable for medical drug delivery flow measurement, microelectronic or semiconductor industry, it is also applicable to other industries such as pharmaceutical, biotech industries and other industries, which employ fluid, flow measurement.

2. Description of Related Arts

Fluid flow measurement is used in many industries including water treatment, beverage industries, pharmaceutical industries, biotech industries, medical industries and other general industrial applications. It is critical in many processes to accurately measure small flow without the contaminant residue from previous measurement. This present invention practically and economically contemplates a new technique and apparatus for fluid measurement, which overcomes the problems of contamination.

U.S. Pat. No. 6,845,330 describes an electromagnetic flowmeter

SUMMARY OF THE PRESENT INVENTION

One objective of the invention is to provide an improved apparatus for measuring liquid flow and still maintain the purity of the liquid. No heat, no chemical additive, no light energy are introduced into the liquid flow. The apparatus consists of Disposable Flow Chamber enclosed in the flow housing, a pair (or multiple pairs) of electrodes, a controllable source of magnetic field, an electrodes switching mechanism, an amplifier circuit, and a micro processor for digital signal processing.

A further object of this invention is to provide a method of constructing the multiple array electrodes within the Flow Chamber. The array structure would provide stronger flow signal.

A further object of this invention is to provide an electrode switching that would help momentarily electrically neutralize the electrodes ionization effect that impairs low frequency signal to noise ratio.

A further objective of this invention is to provide a controllable magnetic source that would allow the micro-processor to remove flow signal from measurement and hence accessing to the noise reference acquisition.

Another advantage and benefit of the present invention is it cost less to produce or manufacture the Disposable Flow Chamber (cost less than a dime to make a Disposable Flow Chamber). The electronic control portion should not cost more than US $25.

Still further advantage and benefits, the present invention will become apparent to those of ordinary skill in the art upon reading and understand the following detailed description of the preferred embodiments.

The present invention provides the following advantage over other technology:

(1) This disposable flow chamber can be made very economically.

(2) The structure of this disposable flow chamber is extremely simple.

(3) The replacement process of this disposable piece is extremely easy.

(4) This device can be packed in compact, lightweight, pocket sized.

(5) This device does not need be recalibrated with fluid of varying viscosity.

(6) This device has a very wide flow rate.

(7) This device has high tolerance to environmental factor such as mechanical vibration, movement, temperature, and pressure.

(8) This device can handle mixed liquid: Liquid with varying viscosity. Liquid carrying small solid particle. Liquid of any colors. Liquid of different temperature.

(9) This device does not add obstacle to the stream of flow.

(10) This device does not need additive seeding to make flow visible.

(11) This device does not release particle to the flow stream.

(12) This device provides the shortest path from flow input to flow output.

In accordance with one aspect of the present invention, an Electro-Magnetic Flow Sensor is provided which solves the issues of past Flow Sensor in small flow that needs a contamination free environment. The Electro-Magnetic Flow Sensor of the present invention increases speed. It increases accuracy. It has a very easy replaceable Disposable Flow Chamber.

This Magnetic Flow Sensor (MagMeter) is designed to measure the flow of electrically conductive fluid in a closed flow chamber. This invention operates on the principal of Faraday's Law of electro magnetic induction. It can be simply stated as:

$$E = \text{constant} \times B \times L \times \text{Speed}$$

Where:

E=magnitude of the voltage.

B=magnetic field density.

L=path length. (Distance between electrodes)

Speed=velocity of fluid.

This equation implies that a voltage is developed when a conductor is passed through a magnetic field. It further stated that the voltage developed is proportional to the density of magnetic field, the length of the conductor, and the velocity of the moving conductor through the B field. Therefore, no moving parts are present in the flow path. In fact, the sensor provides the shortest flow through passage from inlet to outlet. The inner (wetted) areas are completely insolated from outside environment. Hence, it achieves full isolation from outside contaminants. The shortest path is pocket free. It does not trap incoming fluid. This super clean feature is particularly useful in light of high purity requirements of the microelectronic industries. Because of the absence of moveable part, the sensor can be made in a very compact size. Hence it would handle very small flow, and it is suitable be used as hand held personnel equipment. The sensor is used as a stand-alone apparatus, or it is alternatively integrated into one piece with a controllable valve to provide automatic flow control. The extreme simplicity of the design minimizes size, reduces production cost, increases life time, reduces maintenance effort, improves accuracy, enhances speed, and elevates the safety factor. Prior systems have not provided and adequate methodology for readily responding to higher standards of purity and multiple parameter environment such as variable viscosity, variable temperature, agility environment, and variable pressure environment.

BRIEF DESCRIPTION OF THE DRAWINGS

FIG. 6 illustrates how to connect a multiple array electrodes. This figure also illustrates that magnetic field direction of odd electrodes pair have 180 degree phase shift with magnetic field direction of even electrodes. This magnetic field direction arrangement would allow weak signal to add up as shown in FIG. 6.

DETAILED DESCRIPTION OF THE PREFERRED EMBODIMENTS

Figure 1:
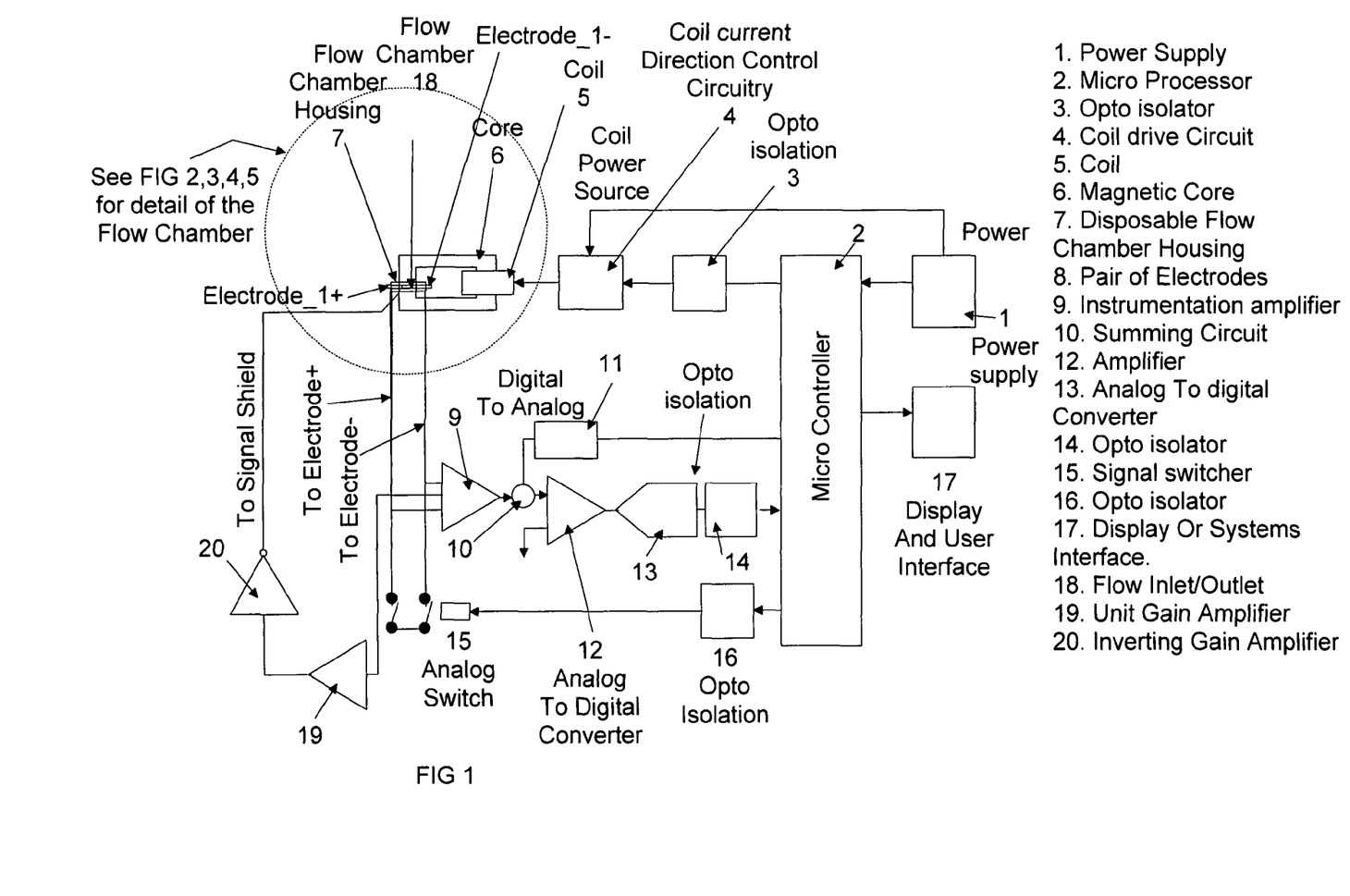
FIG. 1 is a signal processing circuit block diagram of a disposable flow chamber electro-magnetic flow sensor according to a preferred embodiment of the present invention.
Figure 2:
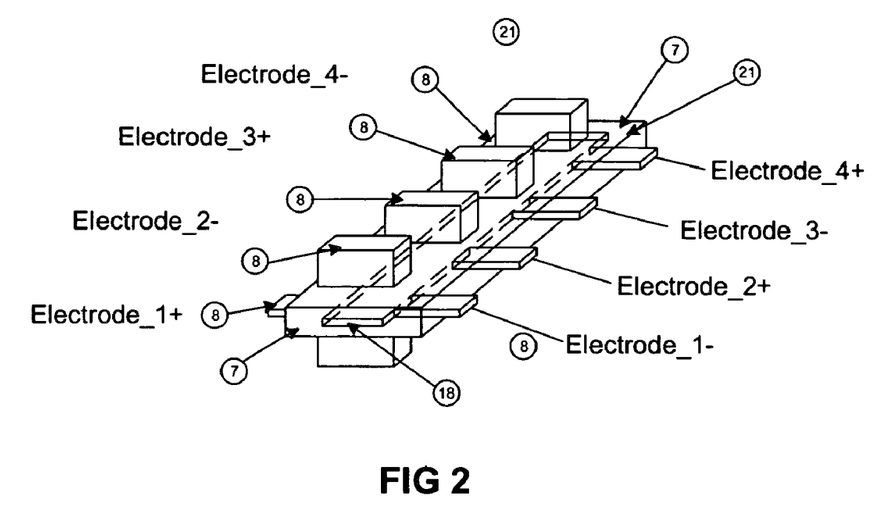
FIG. 2 is a 3-D view of the flow chamber with relative position of array electrodes and magnetic source according to the above preferred embodiment of the present invention, wherein cores are shown partially. For clarity of the relative position of the electrodes and flow chamber, the magnetic core and coil are not shown in FIG. 2.

FIG. 1 is the general block diagram that includes building block of the electronic, a single element of Flow chamber 18 and it associated magnetic circuit. The micro processor 2 controls all the sequence of when to energize the magnetic core, the timing of reading the electrode 8, the timing of amplifier 9 offsetting, and timing of reading pure noise. The detected flow signal is generally composed of both desired signal and several type of undesired noise signal. To remove the effects of undesired signal, we need to know the noise characteristics. This design will employ adaptive filter method to extract the weak suitable noise reference is accessible. It is not the scope of this patent application to explain how adaptive filter work. This patent is rather claiming the apparatus that we use patent will also employ electrodes switching, and magnetic field switching to obtain noise reference as needed by the adaptive filter. This patent will focus of four major claims which are:

(1) Create stronger signal by means of: Multiple array arrangement. Thinner flow chamber.

(2) Accessible to noise by means of measuring signal while varying switching signal path, and controlling the magnetic filed.

(3) Shielding the noise by providing a strong known reference that would absorb noise and shielding intruded noise away.

(4) Disposable flow chamber by means of making an easy accessible, replaceable, and economical integrated flow chamber.

Accordingly, a power supply 1 is a DC to DC power supply to provide two power sources. A low noise low power source supplies power to the all the semiconductors. A second high current power source supplies power to the magnetic coil drive.

A micro-controller 2 is a micro-controller that controls the timing of reading data from an optical isolation block 14, timing of energizing the coil in forward direction, reverse direction or off power.

An optical isolation circuit 3 is a circuit that filters out the noise from micro processor, and also securing the microprocessor from surging voltage of the magnetic circuit.

A voltage switching circuit 4 is a circuit that provides forward voltage, reverse voltage or zero power to the coil.

This building block receives power from the power supply 1 and switch the polarity forward, reverse or off before connecting the power to the coil 5.

The coil 5 is a copper wounded coil with two leads. Applying forward voltage to the coil would generate a positive magnetic field at the center of the coil 5. Applying reverse voltage to the coil would generate negative magnetic field at the center of the coil 5. The generated magnetic field is guided by a magnetic core 6 to the flow chamber 7.

The magnetic core 6 is made by high magnetic permeability material. This core 6 is guiding the magnetic field generated by the coil 5 to the flow chamber 8. The magnetic field is perpendicular from top to downward direction or from bottom to upward direction. This core 6 provides a magnetic gap to allow the insertion of the flow chamber 18.

The flow chamber housing 7 has a rectangular cross section flow chamber at the center of the housing. The flow chamber has an inlet and outlet. One or multiple pairs of electrodes are placed integrally on the inner side wall of the flow chamber. The flow chamber housing should be made thin to fit in the marrow core gap. Smaller core gap can provide stronger magnetic density with lesser electrical power.

Figure 3:
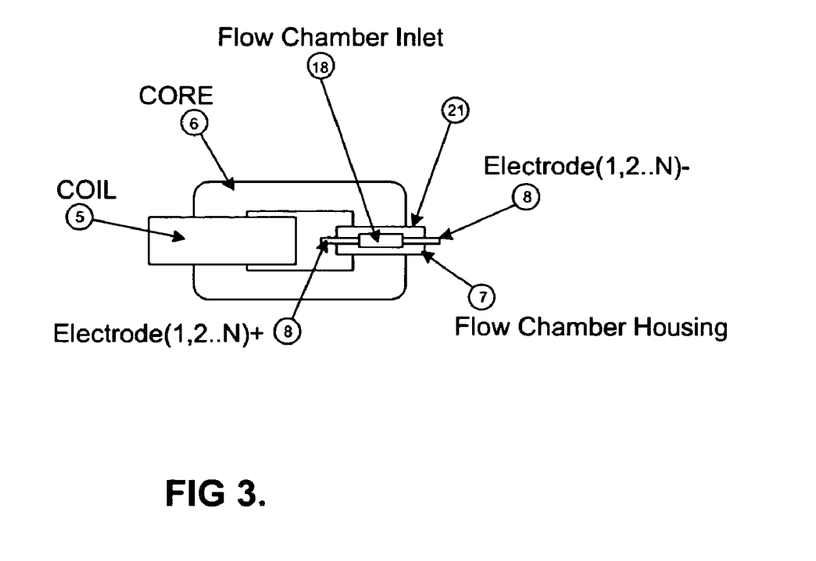
FIG. 3 is a sectional view of the flow chamber from flow inlet side according to the above preferred embodiment of the present invention.
Figure 4:
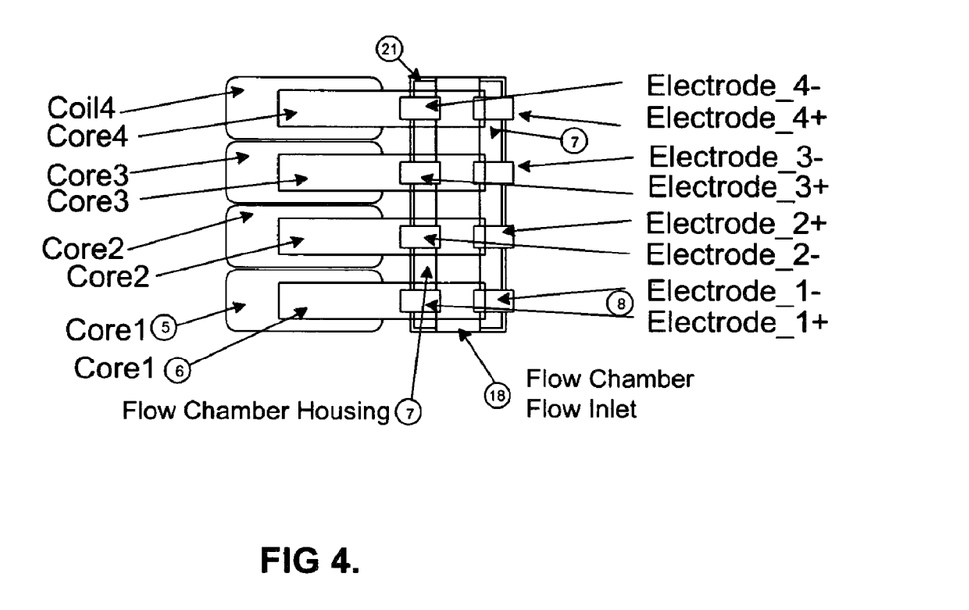
FIG. 4 is a top view of the disposable flow chamber electro-magnetic flow sensor according to the above preferred embodiment of the present invention.
Figure 5:
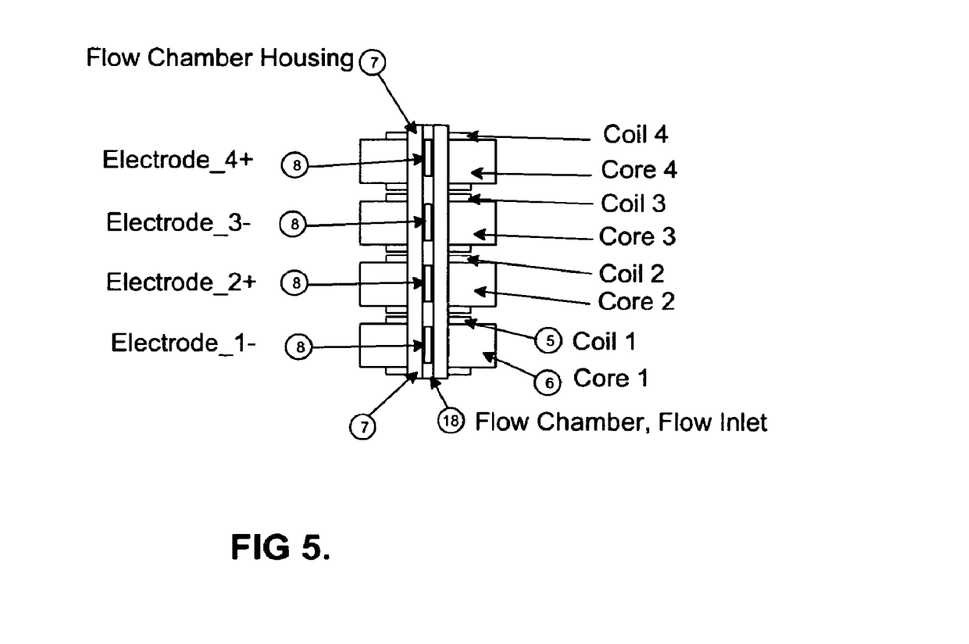
FIG. 5 is a front view of the disposable flow chamber electro-magnetic flow sensor according to the above preferred embodiment of the present invention.
Figure 6:
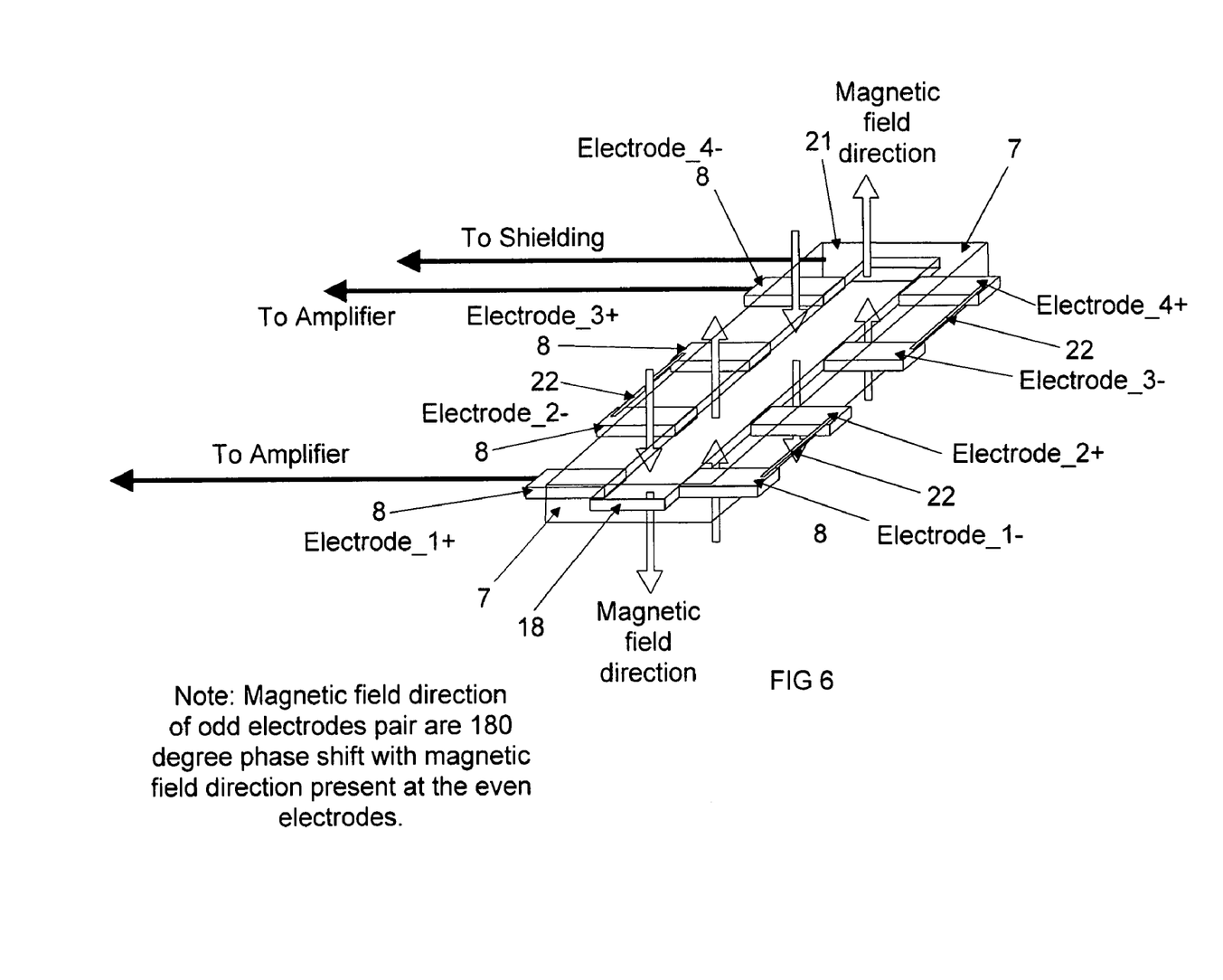
FIG. 6 is a 3-D view of the flow chamber with relative position of array electrodes, and interconnection of electrodes according to the above preferred embodiment of the present invention.

The pair of electrodes 8 runs from inner side wall of the flow chamber housing 7 to outer wall of the flow chamber 18. The flow chamber 18 is constructed so that the flow of liquid run between the two electrodes 8. To handle very slow flow measurement, multiple pairs of electrode 8 can be placed into one single flow chamber housing 7. Connecting 4 pairs of electrodes 8 in series as shown in FIG. 6 would provide a signal of 4 times the strength of the effect of a single electrode 8. FIG. 3 shows the construction of core 6, coil 5, and the flow chamber 18 of elevation view from inlet side. FIG. 4 shows the front view election where user would insert or remove the flow chamber from the core magnetic gap. FIG. 5 illustrates the preferred way to connect several pairs of electrode in series. The outer wall of the flow chamber housing 7 is wrapped with a conductive foil that will be connected to the shield wire 21 from the electronic.

An amplifier 9 is an instrumentation amplifier that has a programmable gain. The amplifier 9 has a means potential electrode + and electrode − (i.e. =(sum of voltage of electrode +plus electrode −) divided by 2). This sum of electrodes potential is buffered by unit gain amplifier 19 then inverted by an amplifier 20 and then the output amplifier 20 is used as signal shield to connect to outer wall of the flow chamber housing 7.

A node 10 is a summing node that adds the signal output of amplifier 9 and output of digital to analog converter 11.

The converter 11 is a digital to analog converter that provides a voltage that makes the output of amplifier 12 stay within the rail of power supply.

The amplifier 12 is a high gain amplifier that provides a measurement voltage to the analog to digital converter 13.

The converter 13 is an analog to digital converter that converts analog electrodes' signal to digital value for further signal processing.

The optical isolation block 14 isolates microprocessor's noise to the analog circuitry.

A switch 15 is an analog switch controlled by microprocessor. This switch 15 time to time shorting out the electrode to the signal shield. Building up of attachment floating ion within the liquid would create an unwanted bias offset between the electrodes. This analog switch 15 put all the electrodes to same voltage potential.

The optical isolation block 16 isolates microprocessor noise to the switch 15.

A user interfacing means 17 is a display or user interface connector. Method of interface with user is not the scope of this patent application.

FIGS. 2, 3, 4, and 5 are the mechanical structure of an array of 4 pairs of electrodes along with the Disposable Flow Chamber. The electrodes, flow chamber, and the Chamber Shield are one integrated piece. A single element array consists of 1 pair of electrode, one core and one coil. A two-element array consists of 2 pairs of electrodes, two cores and two coils. So as N element array consists of N pairs of electrodes, N cores and N coils. The drawings are dimensionless. The integrated flow chamber 18 and electrodes pairs can be only a few microns to a few centimeters. A typical drug delivery application would need a flow chamber 18 of thickness not more than one millimeter. The overall thickness of the flow chamber housing 7 would not exceed ⅓ the dimension of the width.

Figure 7:
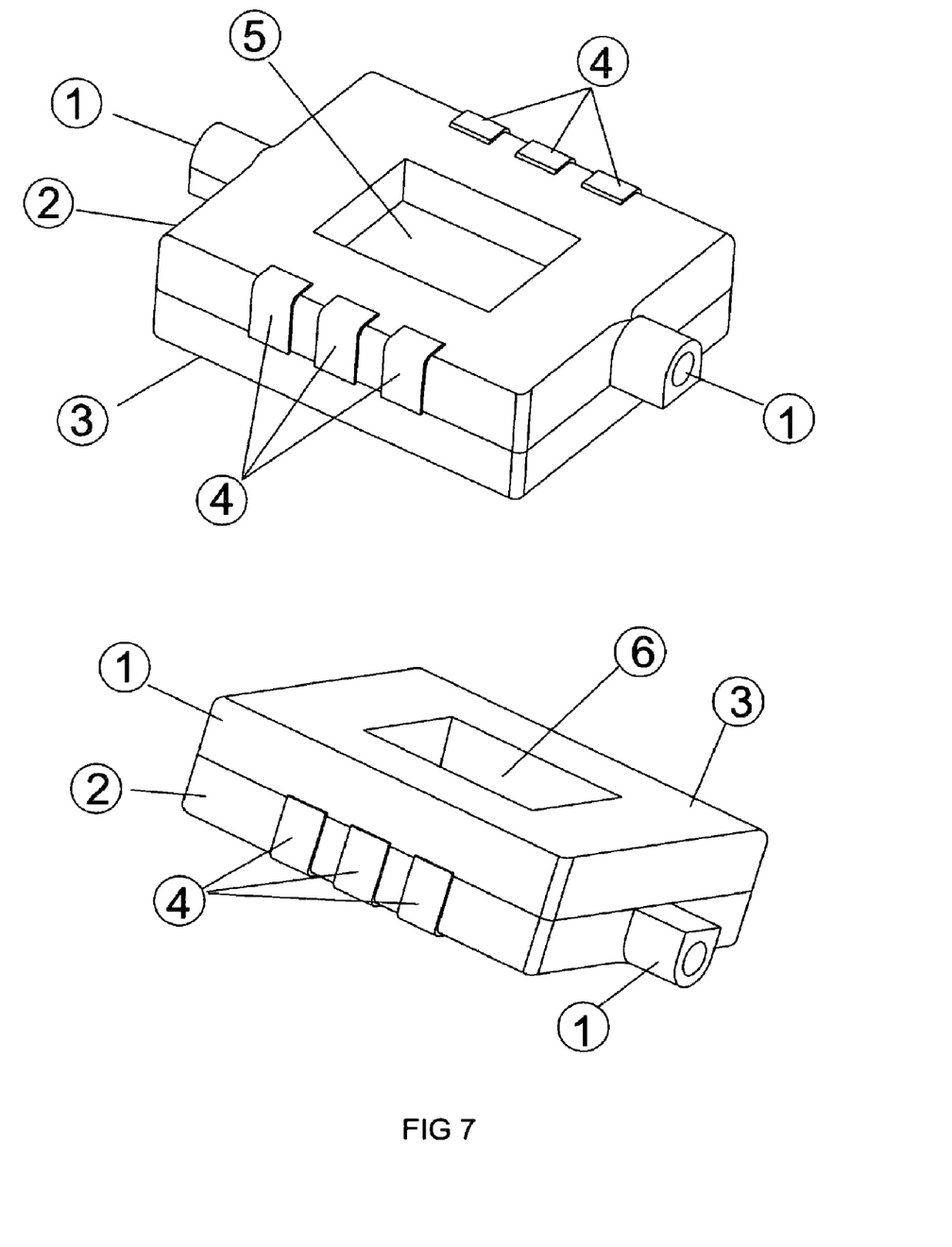
FIG. 7 is a perspective view of the disposable flow chamber electro-magnetic flow sensor according to the above preferred embodiment of the present invention, illustrating the solid model of the flow chamber.
Figure 8:
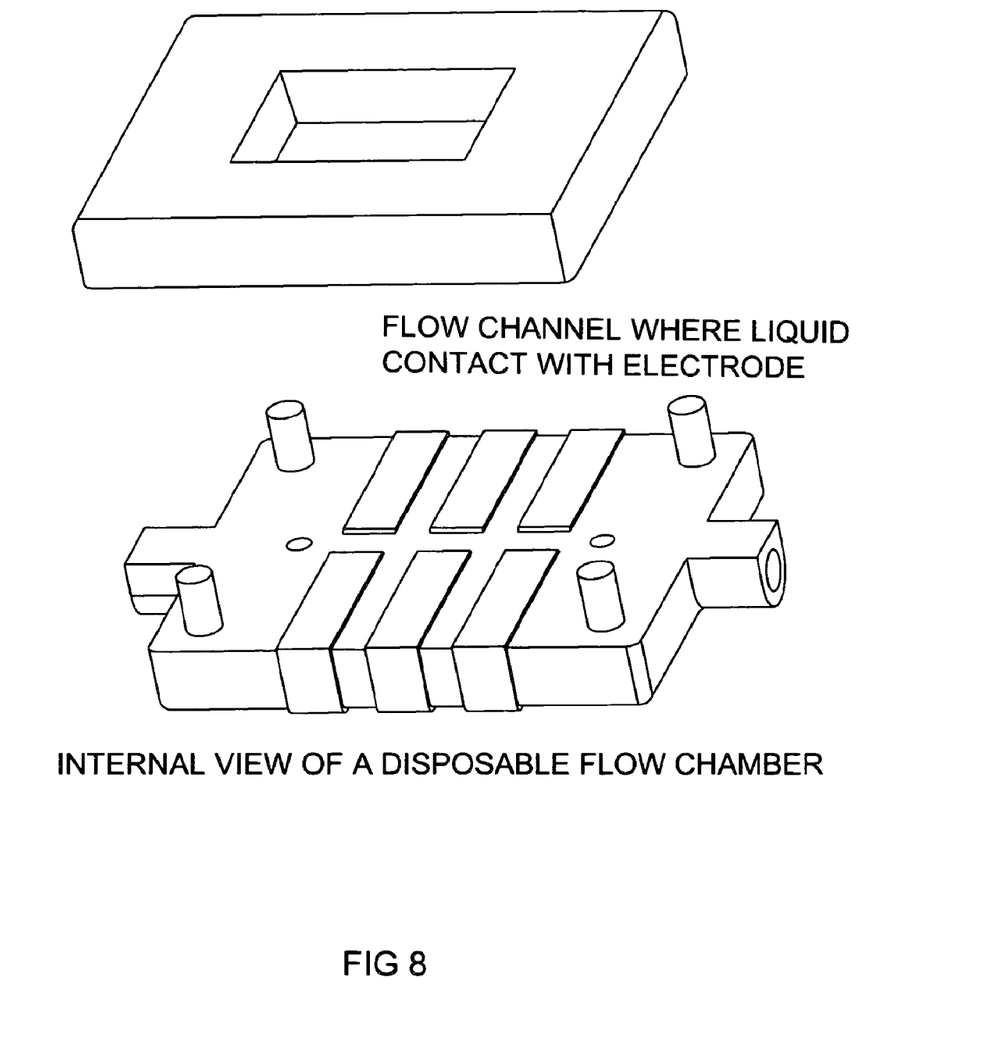
FIG. 8 is an exploded perspective view of the disposable flow chamber electro-magnetic flow sensor according to the above preferred embodiment of the present invention, illustrating the flow channel.

FIG. 7 shows the prototype of the disposable chamber in 3 dimension frame and solid model. In FIG. 7, reference 1 is bi-directional liquid (drug, or other chemical) inlet/outlet. Reference 2 is bottom part of the disposable flow chamber. It is made of medical grade plastic, PVDF or Teflon. Other non-conductive material can also be used for less contaminant sensitive application. The flow inlet leads liquid to the flow channel. The flow channel exposes the liquid in magnetic field perpendicular to the flow direction. Reference 3 is the top cover of flow chamber. Reference 4 is Stainless steel electrodes. This design uses 3 set of electrode sandwiched between the top cover 3 and bottom structure. These electrodes contact with the flow liquid. Each pair of electrodes picks up the electrical field perpendicular to the flow direction. This electrical field is also perpendicular to the magnetic field. These electrodes can be made of other conductive material such as platinum, carbon, gold, or other low corrosive alloy. Reference 5 is the seating place of the permanent magnet external the bottom flow chamber. Reference 6 is the seating place of the permanent magnet external the top flow chamber. Reference 8 is internal view of the disposable flow chamber. Top cover and bottom chamber can be snapped together and sandwiching the electrode and flow channel.

Figure 9:
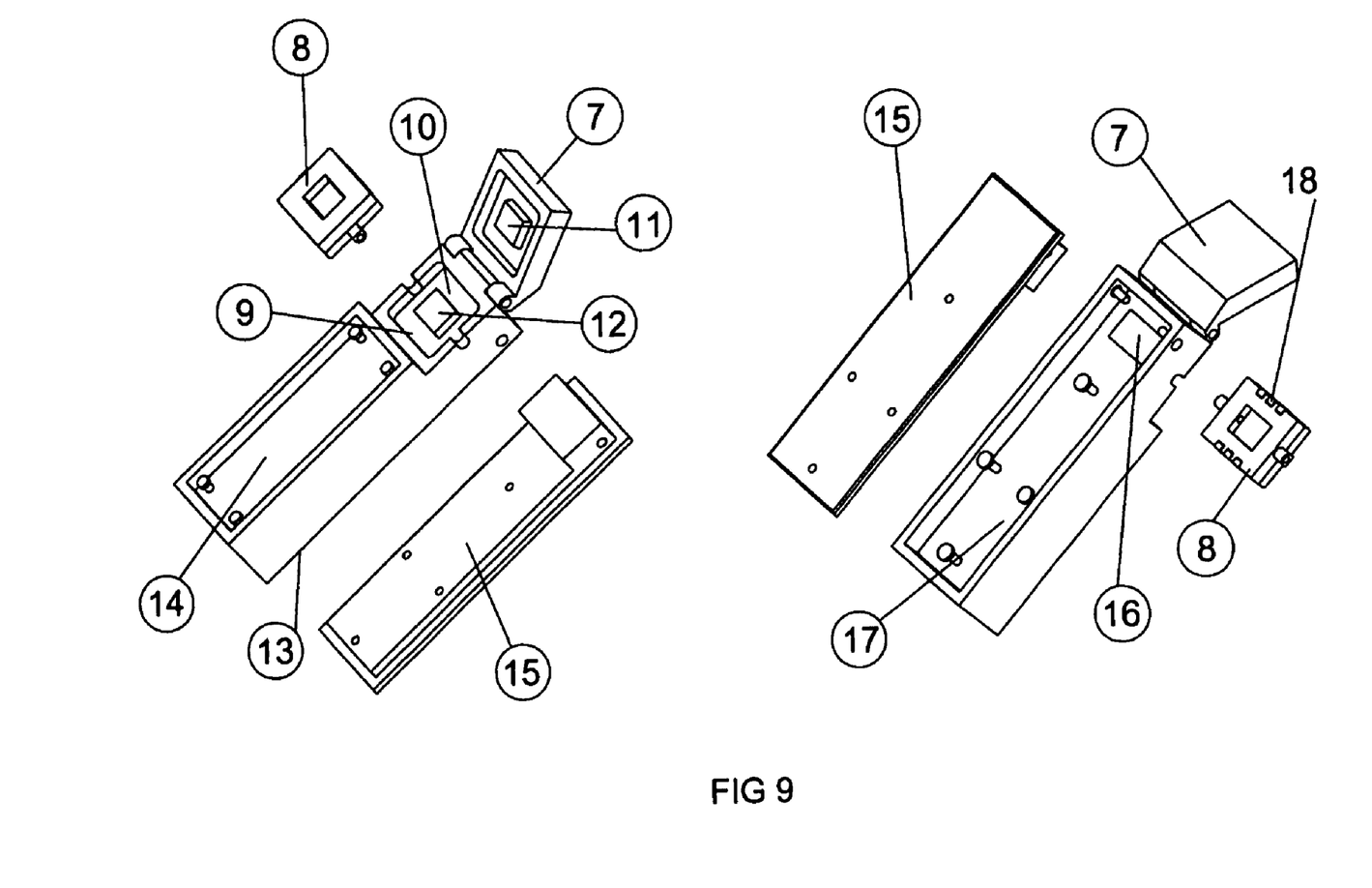
FIG. 9 is an exploded perspective view of the disposable flow chamber electro-magnetic flow sensor according to the above preferred embodiment of the present invention, illustrating the assembly of the disposable flow chamber magnetic flow chamber.
Figure 10:
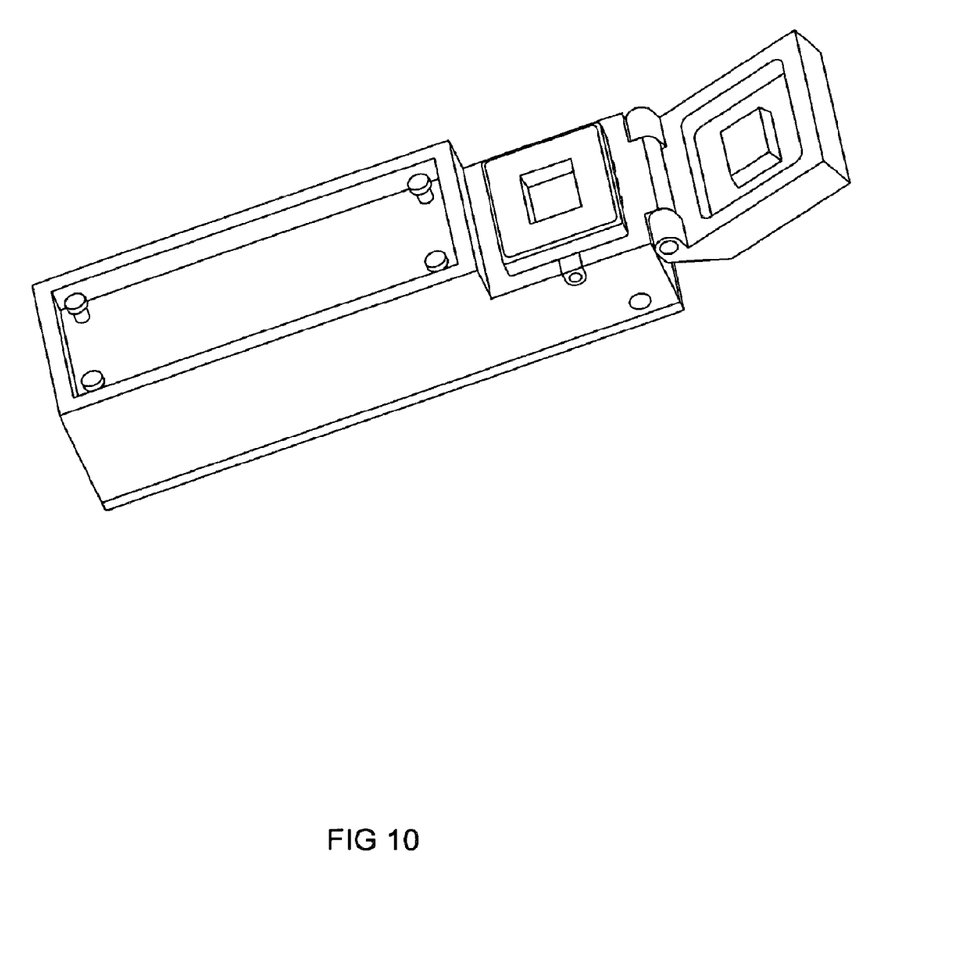
FIG. 10 is a perspective view of the disposable flow chamber electro-magnetic flow sensor according to the above preferred embodiment of the present invention, illustrating the seat cover being opened.
Figure 11:
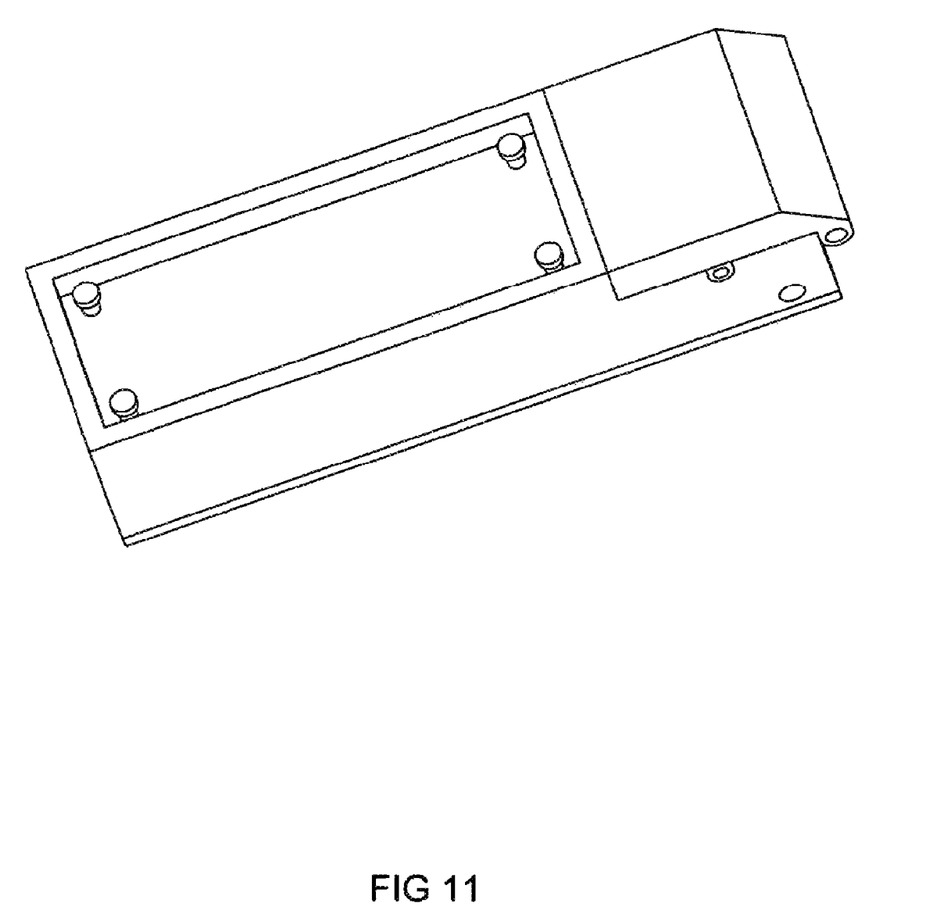
FIG. 11 is a perspective view of the disposable flow chamber electro-magnetic flow sensor according to the above preferred embodiment of the present invention, illustrating the seat cover being closed.

FIG. 9 is the electronic housing of the flow sensor. This electronic housing has a seating place 9 for the disposable flow chamber, a seating place cover 7 to keep the disposable chamber from fall out of the seat, and to keep pressure of the contact between the disposable flow chamber 8 and the bottom seat contact 10. Reference 11 is a permanent magnet fastened to the inner cover. Reference 12 is a permanent magnet fastened to the inner bottom seat. Reference 13 is the body of the flow sensor electronic housing. Within this housing it holds, the PC boards of the sensor, display unit and interface. Reference 14 is the top PCB of the electronic. Reference 15 is bottom cover of the electronic housing. Reference 16 is provision for AC magnetic core mounting place. (AC magnetic field is not used for this prototype). Reference 17 is PCB for sensing electronic. Reference 18 is electrodes contacting area. When snapped in position, the electrodes should make contact with the PCB shown as Reference 17.

Having thus described the preferred embodiment, the invention provides:

(1) An apparatus as liquid flow sensor comprising a disposable flow chamber integrated with one pair of electrode or multiple pairs of electrodes used to provide measurable flow rate data, wherein the voltage magnitude of flow generated in the disposable flow chamber represent the flow data.

(2) A method of building the disposable (replaceable) flow chamber with two essential parts: flow chamber housing and array of electrodes.

(3) A method of using analog switch to short the electrodes to one common potential as part of signal processing procedure.

(4) A method of shielding the flow chamber with an inverted voltage of the electrodes average.

(5) A method of making the magnetic gap to allow ease of insertion of flow chamber housing to the magnetic field.

(6) A method of interconnecting several pairs of electrodes to create stronger signal.

(7) A method of turning on and off, forward polarity and reverse polarity of the magnetic field to create a measurable noise reference.

(8) A method of generating stronger signal by making the flow chamber thinner for smaller magnetic gap, hence stronger magnetic field perpendicular to the pair of electrodes.

(9) A method of providing the signal shielding voltage potential equal to the inversed of the average voltage of the electrodes.

(10) A method of providing multiple magnetic sources to the flow chamber. Where the magnetic field direction presented at odd sequence of electrodes would have a phase shift of 180 degree with magnetic field direction of presented at the even electrodes. This magnetic field direction arrangement allows the summing of weak signal of several electrodes to one stronger flow signal.

Flow Chamber Cassette Embodiment of the Invention

A further embodiment of the invention is shown in FIGS. 12 through 21. This is a flow chamber cassette embodiment providing for a removable and preferably disposable flow chamber cassette which is easily inserted or removed from a receiver which thereafter detects, measures and provides a user with an indication of a flow rate of a polar liquid flowing through a flow chamber of the cassette. Multiple adjacent and opposing pairs of liquid-contacting electrodes are fixed across the cassette flow chamber, whereby electrical connections extend from the electrodes to external pins supported from an insertion flange. The receiver comprises a powered coil and C-core extending from it to define a rectangular orientation slot adapted to securely receive a main body of the cassette, whereafter the insertion flange is impressed into a receiver slot supported within a concavity of the C-core and whereby the flow chamber of the cassette is precisely fixed at a position within the desired magnetic field of the C-core. The receiver slot bears receiver electrical connectors for each external pin of the insertion flange, which receiver electrical connectors extend to an input/output means of a microprocessor which operates under a control program to determine a flow rate within the flow chamber from voltages detected across the electrodes. In a preferred embodiment, the receiver is enclosed in a housing and/or potted in a polymer, except for access to the receiver slot and orientation slot so that liquid cannot contaminate or short circuit essential electrical components of the system.

Figure 12:
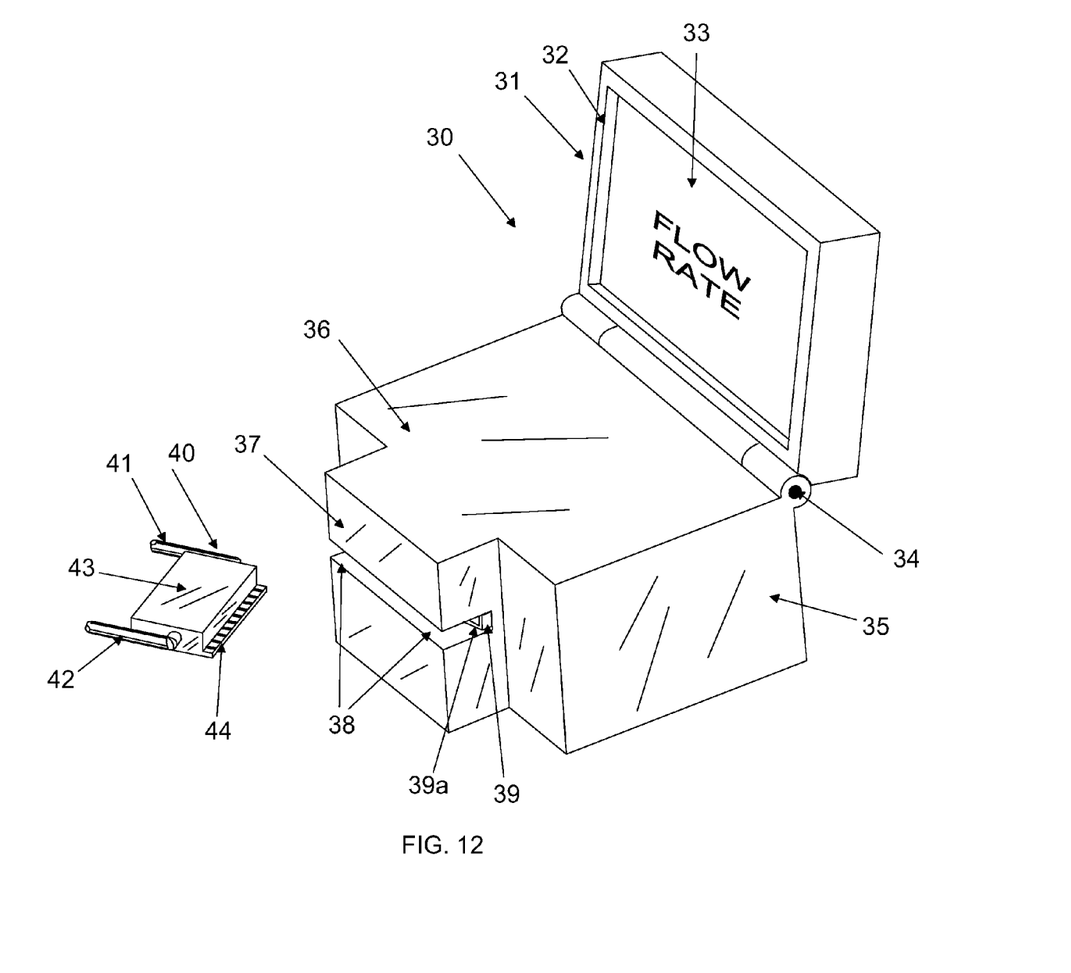
FIG. 12 is perspective view of a flow chamber cassette embodiment of the invention.

FIG. 12 shows the cassette embodiment comprising in a preferred embodiment a flow cassette receiver 30 having a user display 31 with a hinged support frame 32 supporting a liquid crystal display 33 adapted to display information about a sensed and calculated flow rate in the flow chamber of the flow chamber cassette 40, which is shown disconnected from the receiver 30. A hinge 34 allows the display 30 to be rotated into an adjacent relationship with a top surface of enclosure 35, which encloses a powered coil, a C-core, and microprocessor means for calculating a flow rate from sensed voltages at the cassette 40 when it is fixed appropriately to the receiver 30 within orientation slot 38 and an insertion slot 39a defined in plate 39. Cassette 40 comprises conduits 41 and 42 which define internal flow bores which connect with a flow chamber between their connections to cassette body 43. Insertion flange 44 extends forward from cassette body 43 to support the external pins electrically connected with electrodes exposed to liquids in the flow chamber of cassette 40. It is understood that flexible or rigid conduit extensions may be made to conduits 41 and 42 to connect with a liquid circuit whose liquid flow rate will be determined by the invention assembly of the receiver 30 and cassette 40.

Figure 13:
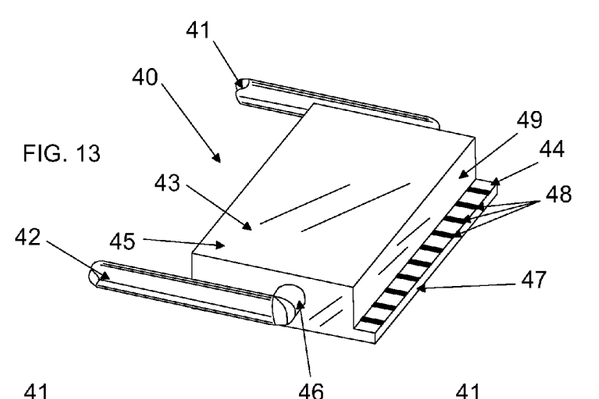
FIG. 13 is a close-up view of the flow chamber cassette of FIG. 12.
Figures 14, 15:
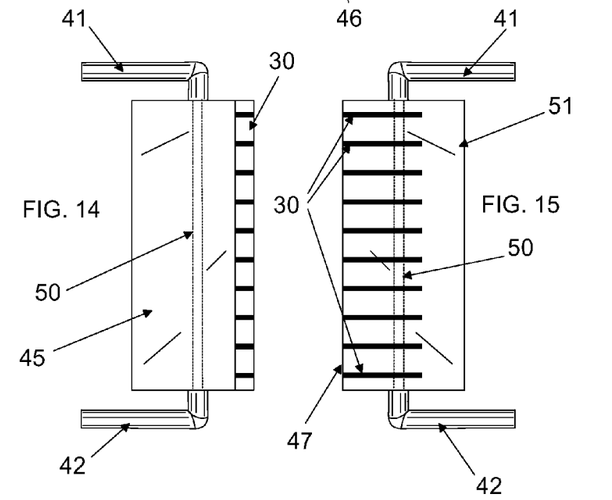
FIGS. 14 and 15 are, respectively, top and bottom views of the flow chamber cassette of FIG. 13.
Figure 16:
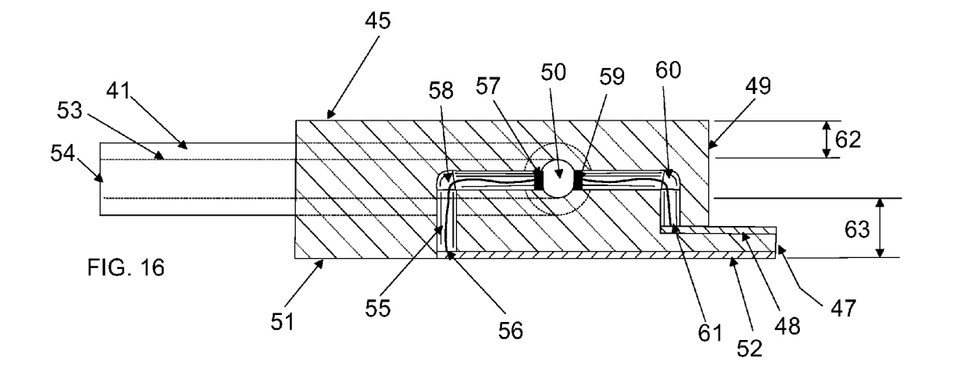
FIG. 16 is a side cutaway view of the flow chamber cassette of FIG. 14.

FIG. 13 shows additional details of cassette 40, where conduit 42 connects at location 46 to body 43, which is rectangular in width cross section and has a height equal to a height of orientation slot 38 shown in FIG. 12 so that insertion of body 43 into orientation slot 38 causes the body 43 to assume a precise orientation with respect to the slot 38 opening in the C-core of receiver 30. Referring again to FIG. 13, body 43 comprises a top surface and front wall 49 which descends to a forward extending insertion flange 44, which bears ten connector pins 48, which electrically extend to electrodes whose backs are oriented toward the front wall 49 and whose faces are directed into the flow chamber of body 43. FIG. 14 shows in broken lines the flow chamber 50 extending between conduits 41 and 42. FIG. 16 shows the bottom side of cassette 40, comprising a bottom surface 51 and ten connector pins 52, which electrically extend to electrodes whose faces are toward from the front wall 49 and whose faces are directed into the flow chamber 50 of body 43.

FIG. 16 shows a side cutaway view of the cassette 40 of FIG. 13 through a pair of opposing electrodes 57 and 59 and their respective connector pins 52 and 48. Conduit 41 is shown with its internal bore 53 in broken lines and indicating an external opening 54 for connection to another conduit in the liquid circuit. With respect to electrodes 57 electrically connected with pins 52, an internal bore 58 defines a space for passage of wire 55 to extend from pin 52 at point 56 to the back side of electrode 57, whose face is exposed to the flow chamber 50. With respect to electrodes 59 electrically connected with pins 59, an internal bore 60 defines a space for passage of wire 61 to extend from pin 48 to the back side of electrode 59, whose face is exposed to the flow chamber 50. Electrodes 57 and 59 form a pair of opposing electrodes, across whose voltage will be measured by the microprocessor means for calculation of a flow rate. It will be appreciated that this preferred embodiment consists of 10 pairs of adjacent and opposing electrodes corresponding to the number of pins 48 and pins 52, but the number of such opposing electrodes may be a number greater than two, more preferably at least four pairs of opposing electrodes. Distance 62 defines a top distance from a flat upper surface of the C-core of the receiver to the top of the flow chamber 50. Distance 63 defines a bottom distance from a flat lower surface of the C-core of the receiver to the bottom of the flow chamber 50. Causing cassette 40 to be located in the insertion position results in surface 45 to be in adjacent contact with the flat upper surface of the C-core of the receiver, surface 51 to be in adjacent contact with the flat lower surface of the C-core of the receiver, and the insertion flange 44 to be inserted in the insertion slot of the receiver, whereby the flow chamber 50 is aligned precisely within a magnetic field substantially uniform along the length of the flow chamber 50.

Figure 17:
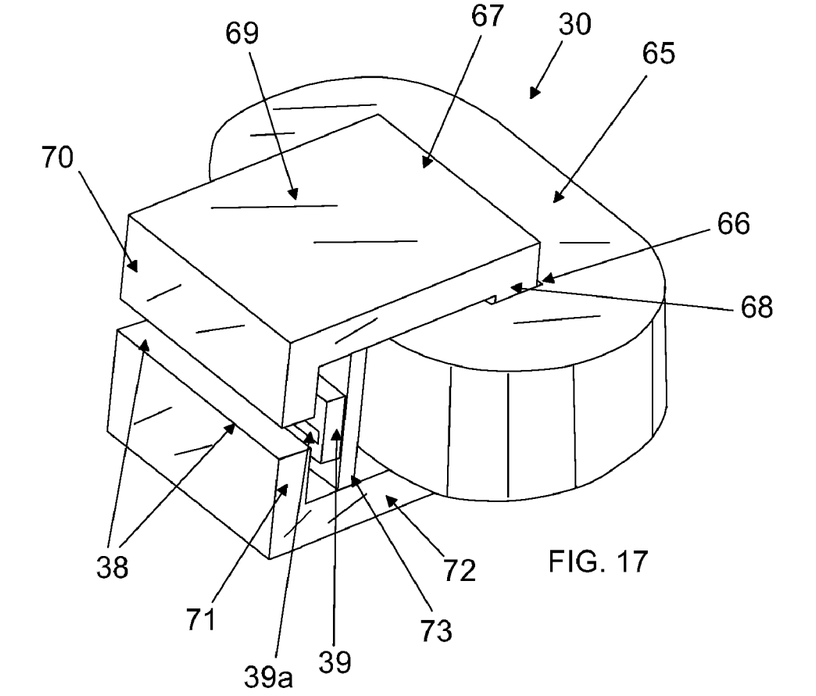
FIG. 17 is a perspective view of a flow chamber cassette receiver for the flow chamber cassette of FIG. 13.
Figure 18:
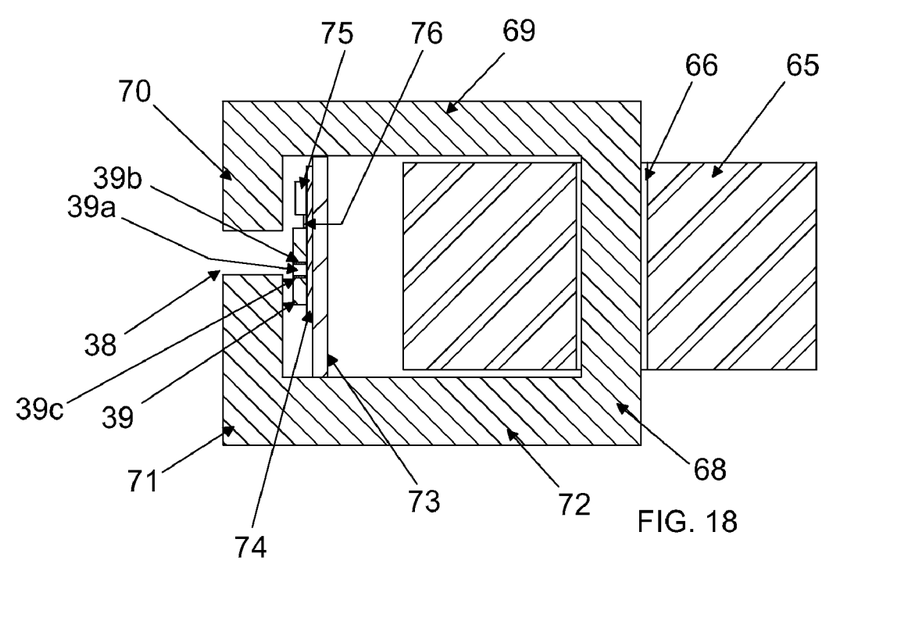
FIG. 18 is a side cutaway view of the receiver of FIG. 17.

FIGS. 17 and 18 show receiver 30 without an enclosure or covering to protect it from liquids that may harm its performance, an enclosure shown in FIG. 12. Coil 65 is a well known wire wrapped coil which is powered appropriately so that its rectangular bore 66 is the location of a substantial magnetic field imparted to the C-core 67 by way of section 68 within the bore 66 and transmitted along top section 69 and bottom section 72 to, respectively, upper section 70 and lower section 71, which are separated by a rectangular orientation slot 38. A space is defined between an outside surface of a long side of coil 65 and the opposing inner surfaces of sections 70 and 71 and inner surfaces of sections 69 and 72. Within this space is fixed a support wall 73 which supports insertion plate 39 with an intervening printed circuit board 74, which further bears microprocessor means 75 and are electrically connected via connectors 76 for input from electrodes within the invention cassette. Insertion slot 39a is defined with insertion plate 39 and bears opposing pins 39b and 39c for connecting with the external pins of the cassette's insertion flange. It will appreciated from FIG. 18 that opposing surfaces defining slot 38 are parallel and provide precise vertical orientation to an inserted cassette according to the invention.

Figure 19:
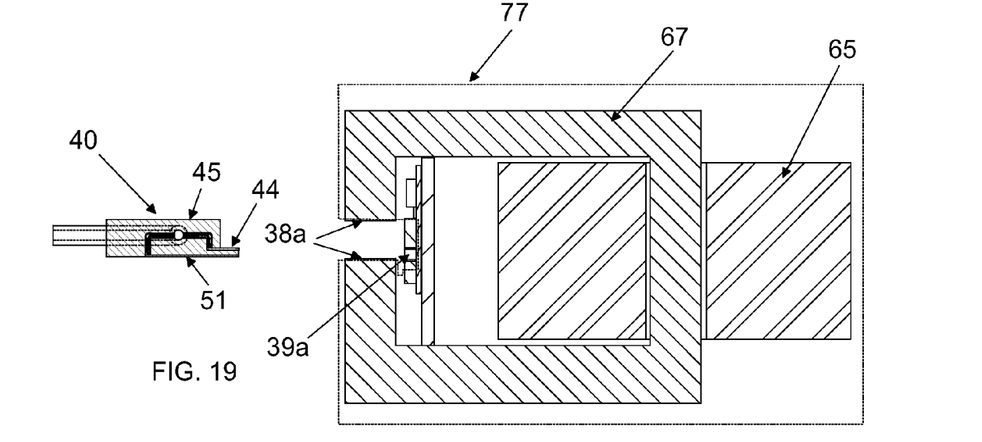
FIG. 19 is the cassette of FIG. 16 and the receiver of FIG. 17 shown oriented prior to effective connection, showing the encasing of the receiver of FIG. 17 as shown in FIG. 12 in broken lines.

FIG. 19 provides a side view of the cassette 40 of FIG. 16 just before insertion into the receiver of FIG. 18. Surfaces 38a are adapted to smoothly contact surfaces 45 and 51 when cassette 40 is inserted into insertion slot 39a. Also shown in broken lines are a side view of the enclosure or potting outline 77 which will provide the enclosure against contact with external liquids as seen in FIG. 12.

Figure 20:
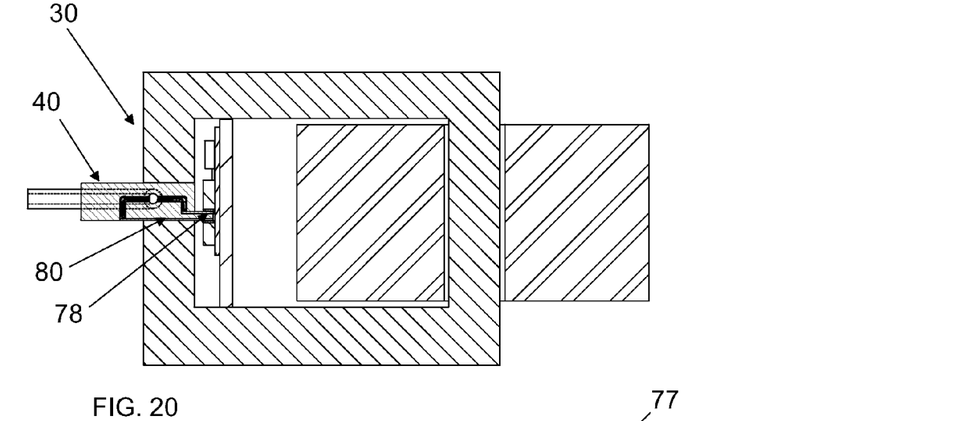
FIG. 20 is the cassette of FIG. 16 and the receiver of FIG. 17 shown oriented in effective connection.
Figure 21:
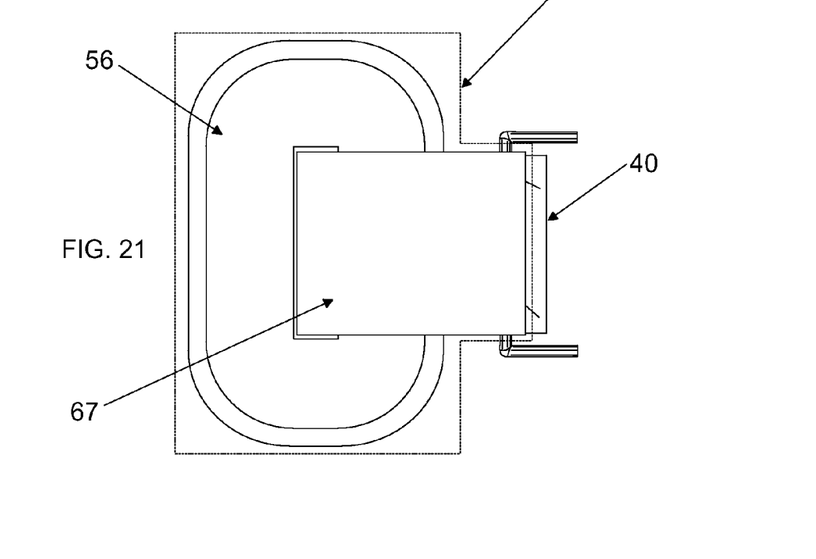
FIG. 21 is a top view of the assembly of FIG. 20, showing the encasing of the receiver of FIG. 17 as shown in FIG. 12 in broken lines.

FIG. 20 shows cassette 40 effectively connected with receiver 30. The insertion flange is inserted at the insertion slot at interface 78 and the upper and lower surfaces of the cassette body are located smoothly adjacent to the upper and lower surfaces of the orientation slot at interface 80. Power means are not shown for the coil or the microprocessor means but are understood to be provided for appropriate powering of these devices. Power may be provided by batteries located within the enclosure of FIG. 12 or by way of wired connections to other external electrical power sources. Connection is also provided from the microprocessor means to the display shown in FIG. 12 for display and/or other output of flow rate determination by the microprocessor means.

FIG. 20 shows a top view of FIG. 19, in that outline 77 shows additional detail of a preferred enclosure for receiver 30.

In operation, a user will obtain an invention cassette as in FIG. 13, connect it to a liquid circuit at the conduits 41 and 42 and then insert it appropriately into receiver 30. The microprocessor means are provided with an input/output unit for communication with external devices such as cassette electrodes through the wires and pins described above and the appropriate display. The microprocessor means are further provided with a microprocessor and control program to receive information about measured voltages across said electrodes, calculate a flow rate of liquid within the cassette flow chamber, and thereafter to store in memory and/or output that flow rate value for transmission or local display. Transmission of the flow rate may cause it to be delivered to remote correspondents such as across a local or computer network.

The invention has been described with reference to the preferred embodiments. Obviously, modifications and alternations will occur to others upon reading and understanding the preceding detailed description. It is intended that the invention be construed as including all such modifications and alterations insofar as they come within the scope of the appended claims or the equivalents thereof.

I claim:

1. An electro-magnetic flow chamber cassette and flow chamber cassette receiver assembly for measuring a flow rate of liquid, comprising:
    (a) a liquid flowing apparatus, which is communicatively linked with a flow chamber cassette to flow a liquid through a flow chamber defined within and across a width of a cassette body of said cassette;
    (b) the cassette body having an insertion length with a uniform rectangular cross section across the width of the cassette body and thereby defining an upper body surface and a lower body surface parallel to each other, where an insertion flange extends forward from the cassette body and conduit means extend from the cassette body for connection of the flow chamber to the liquid flowing apparatus;
    (c) two or more pairs of electrodes alignedly integrated with said flow chamber, said electrodes arranged in adjacent pairs spaced apart along a length of said flow chamber housing so that each electrode pair has opposing ends in contact with said flowing liquid to define an axial distance normal to said flowing liquid, where external pin connectors exposed at the insertion flange are electrically connected with each of said electrodes;
    (d) the receiver comprising a powered coil and a C-shaped core extending by way of two ends of a core section from a central bore in the coil to top and bottom sections generally parallel and normal to an axis of the core section, wherefrom respectively ends of the top and bottom sections extend toward each other an upper section and a lower section to define an orientation slot having parallel upper and lower surfaces separated from each other by a distance about equal to a height of said rectangular cross section of the cassette body for generating a magnetic field across said orientation slot; and
    (e) the receiver further comprising pin connection means supported in a space defined between inside surfaces of said top and bottom sections so that the insertion flange is removably insertable therein when the cassette body is located in the orientation slot, thereby locating the flow chamber in said magnetic field and electrically connecting said external pin connectors to microprocessor means for determining voltage across each electrode pair and therefrom calculating a flow rate of said flowing liquid for output to a user interface.

2. The assembly of claim 1 wherein multiple voltage magnitudes of said electrode pairs are summed by the microprocessor means and a summed voltage magnitude is divided by the number of said electrode pairs as a first step in calculation of said flow rate.

3. The assembly of claim 1 wherein the coil of said receiver is substantially enclosed by enclosing means resistant to external liquid contact.

4. The assembly of claim 3 wherein the core section, top section and bottoms section of the C-shaped core are substantially enclosed by the enclosing means.

5. The assembly of claim 4 wherein a display screen extends supportively from said enclosing means for connection with said microprocessor means and display of said flow rate to a user.

6. An electro-magnetic flow chamber cassette and flow chamber cassette receiver assembly for measuring a flow rate of liquid, comprising:
    (a) a liquid flowing apparatus providing flowing liquid through a flow chamber defined across a width of a cassette body of said cassette;

(b) said cassette body having an insertion length with a uniform thickness across a width of the cassette body and thereby defining an upper body surface and a lower body surface parallel to each other, where an insertion flange extends forward from the cassette body and conduit means extend from the cassette body for connection of the flow chamber to the liquid flowing apparatus;

(c) two or more pairs of electrodes alignedly integrated with said flow chamber, said electrodes arranged in adjacent pairs spaced apart along a length of said flow chamber housing so that each electrode pair has opposing ends in contact with said flowing liquid to define an axial distance normal to said flowing liquid, where external pin connectors exposed at the insertion flange are electrically connected with each of said electrodes;

(d) the receiver comprising a powered coil and a C-shaped core extending by way of two ends of a core section from a central bore in the coil to top and bottom sections generally parallel and normal to an axis of the core section, wherefrom respectively ends of the top and bottom sections extend toward each other an upper section and a lower section to define an orientation slot having parallel upper and lower surfaces separated from each other by a distance about equal to a height of said rectangular cross section of the cassette body for generating a magnetic field across said orientation slot; and (e) the receiver further comprising pin connection means supported in a space defined between inside surfaces of said top and bottom sections so that the insertion flange is removably insertable therein when the cassette body is located in the orientation slot, thereby locating the flow chamber in said magnetic field and electrically connecting said external pin connectors to microprocessor means for determining voltage across each electrode pair and therefrom calculating a flow rate of said flowing liquid for output to a user interface.

7. The assembly of claim 6 wherein multiple voltage magnitudes of said electrode pairs are summed by the microprocessor means and a summed voltage magnitude is divided by the number of said electrode pairs as a first step in calculation of said flow rate.

8. The assembly of claim 6 wherein the coil of said receiver is substantially enclosed by enclosing means resistant to external liquid contact.

9. The assembly of claim 8 wherein the core section, top section and bottoms section of the C-shaped core are substantially enclosed by the enclosing means.

10. The assembly of claim 9 wherein a display screen extends supportively from said enclosing means for connection with said microprocessor means and display of said flow rate to a user.

\* \* \* \* \*